Feb. 12, 1924.                                           1,483,532
H. W. TOBEY
WORKHOLDING APPARATUS
Filed Nov. 17, 1922

Inventor:
Harry W. Tobey,
by Alexander F. ____.
His Attorney

Patented Feb. 12, 1924.

1,483,532

UNITED STATES PATENT OFFICE.

HARRY W. TOBEY, OF PITTSFIELD, MASSACHUSETTS, ASSIGNOR TO GENERAL ELECTRIC COMPANY, A CORPORATION OF NEW YORK.

WORKHOLDING APPARATUS.

Application filed November 17, 1922. Serial No. 601,662.

*To all whom it may concern:*

Be it known that I, HARRY W. TOBEY, a citizen of the United States, residing at Pittsfield, in the county of Berkshire, State of Massachusetts, have invented certain new and useful Improvements in Workholding Apparatus, of which the following is a specification.

My invention relates to improvements in work holding apparatus, and an object of my invention is to provide a simple and rugged apparatus whereby metal sheets or other articles to be welded or otherwise secured together may be readily secured and adjusted so that the edges may be accurately brought together in a desired line. More particularly, an object of my invention is to provide work holding means adapted to adjust and hold sheets or other articles having upturned edges which are to be welded in a line welding machine.

My invention will be better understood from the following description taken in connection with the accompanying drawing, and its scope will be pointed out in the appended claims.

Figure 2:
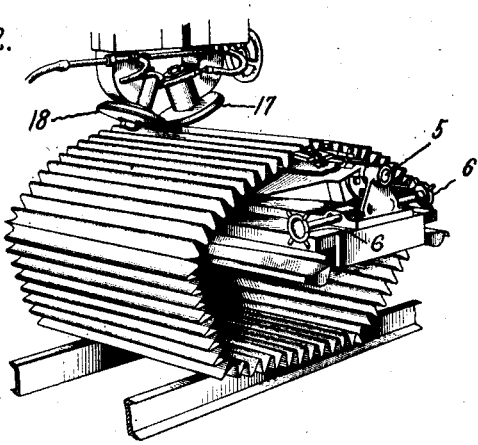
Figure 1:
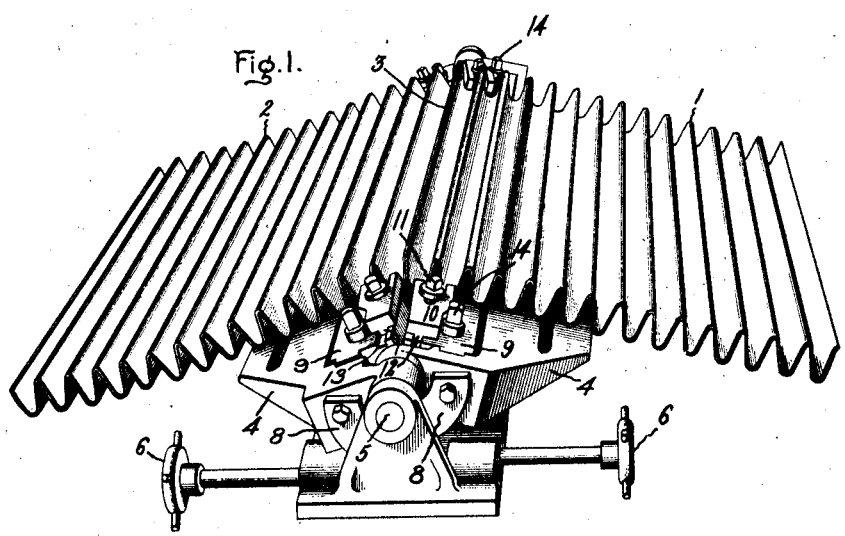
Figure 3:
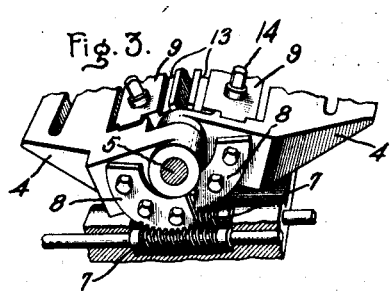
Figure 4:
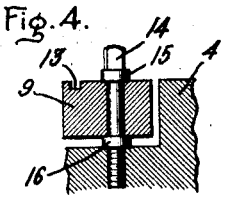

In the accompanying drawing, Fig. 1 shows my work holding means arranged to hold in place the upturned edges of corrugated sheets to be welded together; Fig. 2 shows how my work holding means is adapted for use in a line welding machine, and Figs. 3 and 4 are views showing details of construction of the device shown in Fig. 1.

In order that the edges of metal sheets may be readily welded together it is necessary to bring the edges accurately together and in alignment throughout the length of the seam to be welded. The sheets should be held firmly in the desired position until the weld is completed. It is desirable not only to be able to adjust the angle between the planes of the sheets, but also to be able to adjust or incline the plane in which each sheet lies in order that the edges may be in alignment throughout their length.

According to my invention I provide a supporting member for each of the sheets to be welded and arrange these supporting members so that they can be rotated or rocked about an axis so as to bring the edges of the sheets together in the line in which the weld is to be made. When the edges of the sheets are brought together it may be that they will not lie substantially flush throughout their length and this is particularly true where the sheets have upturned edges which are to be welded together. In order to overcome this difficulty and make it possible to have the edges of the sheets in perfect alignment throughout their length, I mount a work holding member on each of the work supporting members and provide means whereby these work holding members may be adjusted with respect to their supporting members so that the inclination of one sheet with respect to the other may be adjusted to secure the desired alignment of the edges to be welded.

Referring to Fig. 1 of the accompanying drawing, the articles to be welded are shown as a pair of corrugated metal sheets 1 and 2 the upturned edges 3 of which are to be welded together. Each sheet is mounted on a work supporting member 4 pivoted about an axis 5 substantially in the plane of the line of the weld. The hand-wheel 6 is arranged to turn the worm 7 engaging with a segment of a worm wheel 8 secured to the work supporting member. It will, therefore, be apparent that by turning the hand-wheels 6 the work supporting members 4 may be rocked about the axis 5 to bring together the edges of the sheets to be welded. The sheets to be welded are secured in place by work holding members 9 mounted in recesses in the adjacent edges of the work supporting members 4 so that the surface of the work holding members 9 is substantially flush with the surface of the work supporting members 4. The sheets to be welded may be secured to the work holding members 9 in any desired manner and for this purpose I have shown clamps 10 which engage the work and are forced into engagement therewith by means of bolts 11. The clamp 10 may be provided with a lug 12 engaging a groove 13 in the work holding member 9 to assist in holding the clamp in place. In order to adjust and incline the plane in which a sheet lies, I provide means preferably comprising screw mechanism for adjusting the height and inclination of the work holding members 9 with respect to the work holding members 4. In the drawing I have shown a pair of screws 14 provided with collars 15 and 16 located above and below the member 9. By adjusting these screws 14 in one work holding member to the same extent, said member may be raised or lowered to adjust vertically the edge of one sheet with respect to the edge of the other sheet. Also, by properly adjusting the screws one end of the member 9 may be raised higher than the other end so as to vary the inclination of the work holding members with respect to the work supporting members and thus vary the inclination of the edges of one sheet with respect to the edges of the other sheet to bring said edges into flush alignment. While this alignment adjusting means may be provided on but one of the work supporting members, I prefer to provide it on both of the adjusting members so that each of the sheets 1 and 2 may be adjusted.

After the edges of the work have been adjusted to the alignment desired, the edges of the plates may be secured together in any desired manner, for example, by line welding or arc welding. Since each sheet is independently secured to its supporting member the sheets may be easily and quickly secured in place without interference with one another and afterwards simply and quickly adjusted for substantially perfect alignment.

In Fig. 2 I have shown my work holding means used in connection with a line welding machine comprising roller electrodes 17 and 18 which may be connected in a well known manner to the secondary of a transformer so that the welding current is passed from one roller 17 through the juxtaposed edges of the sheets to be welded and thence to the electrode 18. Relative motion betwen the roller electrodes 17 and 18 and the work may be secured in any desired manner so as to traverse the electrodes along the line of the seam to be welded. Fig. 2 shows the work as comprising corrugated sheets to form a tank, such for example, as a transformer tank. After the seam between one pair of sheets has been welded the work is moved so that a weld may be made between the other edge of one of the sheets already welded and another sheet, this operation being repeated until the tank is completed.

While I have shown my invention in connection with the welding of corrugated sheets having upturned edges it is apparent that plain sheets may be used and while my invention is of particular utility where sheets having upturned edges are to be welded together, it is apparent to those skilled in the art that my invention will also facilitate the adjustment of plain sheets to bring their edges into alignment for any desired purpose.

While I have shown and described a particular embodiment of my invention, it will be obvious to those skilled in the art that changes and modifications may be made within the scope of my invention and I, therefore, aim in the appended claims to cover all such changes and modifications as fall within the spirit of my invention.

What I claim as new and desire to secure by Letters Patent of the United States, is:—

1. A work holding apparatus of the class described comprising a pair of pivoted work supporting members, a working holding member, provided with means for clamping the work, mounted on each work supporting member, and means whereby said working holding members may be adjusted to vary the height and inclination thereof with respect to said work supporting members.

2. A work holding apparatus for use in welding together the upturned edges of metal sheets comprising a pair of work supporting members, means whereby said work supporting members may be rotated to bring the upturned edges of said sheets together, a work holding member, provided with means for clamping the sheets to be welded, mounted on each work supporting member, and means whereby said work holding members may be adjusted to vary the height and inclination thereof with respect to said work supporting members whereby the upturned edges of said sheets may be aligned throughout their length.

3. A work holding apparatus for holding in alignment work having edges to be welded together comprising a pair of work supporting members pivoted substantially in the plane of the line of the weld, work holding members mounted on each work supporting member and means wherby said work holding members may be adjusted to vary the inclination thereof with respect to said work supporting members.

4. A work holding apparatus for holding in alignment work having edges to be welded together comprising a work supporting member pivoted substantially in the plane of the line of the weld, a work holding member mounted on said work supporting member, and means whereby said work holding member may be adjusted to vary the height and inclination thereof with respect to said work supporting member.

5. A work holding apparatus for holding in alignment work having edges to be welded together comprising a pair of work supporting members mounted for rotation about an axis substantially in the plane of the line of the weld, a work holding member mounted in one of said work supporting members so that its surface is substantially flush with the surface of said supporting member and means for adjusting said work holding member to adjust the height and inclination thereof with respect to said supporting member.

6. A work holding apparatus of the class described comprising a pair of work supporting members pivotally mounted at adjacent edges thereof, each of said adjacent edges being provided with a recess, a work holding member, provided with means for clamping the work, mounted in each of said recesses, and screw mechanism whereby the position of said work holding members may be adjusted in said recesses to vary the height and inclination thereof with respect to said work supporting members, and worm gearing for adjusting each of said supporting members about the axis in which it is pivoted.

In witness whereof, I have hereunto set my hand this 15th day of November, 1922.

HARRY W. TOBEY.